(12) United States Patent
Cieslak et al.

(10) Patent No.: US 10,735,919 B1
(45) Date of Patent: Aug. 4, 2020

(54) RECIPIENT-BASED CONTENT OPTIMIZATION IN A MESSAGING SYSTEM

(71) Applicant: Snap Inc., Santa Monica, CA (US)

(72) Inventors: Michael Ronald Cieslak, Los Angeles, CA (US); Zahra Ferdowsi, Marina del Rey, CA (US); Jun Huang, Beverly Hills, CA (US); Michael David Marr, Monroe, WA (US); Jiayao Yu, Venice, CA (US); Finn Parnell, Los Angeles, CA (US); Aleksandr Zhang, Seattle, WA (US); Chao Pang, Marina Del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/453,556

(22) Filed: Jun. 26, 2019

(51) Int. Cl.
*H04W 4/18* (2009.01)
*H04W 4/12* (2009.01)
*H04W 28/02* (2009.01)
*H04L 29/06* (2006.01)
*H04L 12/58* (2006.01)

(52) U.S. Cl.
CPC .............. *H04W 4/18* (2013.01); *H04L 65/602* (2013.01); *H04W 4/12* (2013.01); *H04W 28/0215* (2013.01); *H04L 51/10* (2013.01); *H04L 63/104* (2013.01)

(58) Field of Classification Search
CPC ......... H04W 8/186; H04W 4/08; H04W 4/14; H04W 4/21; H04W 28/0215; H04W 4/12; H04L 43/50; H04L 67/306; H04L 67/10; H04L 51/10; H04L 63/104; H04L 12/18; H04L 51/04; H04L 51/32; H04L 65/4069; H04L 65/60; H04L 65/601
See application file for complete search history.

(56) References Cited

U.S. PATENT DOCUMENTS

| | | | | |
|---|---|---|---|---|
| 2006/0259629 | A1* | 11/2006 | Usmani | G06F 11/3688 709/227 |
| 2012/0149404 | A1* | 6/2012 | Beattie, Jr. | H04M 1/274508 455/466 |
| 2016/0057087 | A1* | 2/2016 | Gomba | H04L 51/10 709/206 |

* cited by examiner

*Primary Examiner* — Nam T Huynh
(74) *Attorney, Agent, or Firm* — Schwegman Lundberg & Woessner, P.A.

(57) ABSTRACT

Aspects of the present disclosure involve a system and method for performing operations comprising receiving, by one or more processors, from a sender device, a content to be shared with one or more recipients via a messaging application; identifying, by the one or more processors, at least one recipient device for each recipient; accessing, by the one or more processors, device capabilities for each of the one or more recipient devices; determining, by the one or more processors, a set of content parameters compatible with the device capabilities of the recipient devices; and generating, by the one or more processors, a version of the content according to the set of content parameters.

18 Claims, 10 Drawing Sheets

RECIPIENT-BASED CONTENT OPTIMIZATION IN A MESSAGING SYSTEM

BACKGROUND

As consumption of content on mobile devices continues to grow, the diversity of devices used to consume content via messaging applications also grows. Client devices used to consume content have different capabilities, such as in terms of processing power, and operating system. In addition, the capabilities of a client device, such as battery levels, available storage space, network type, and bandwidth, vary over time. Application developers infrequently consider the heterogeneous capabilities of the client devices used to run the applications which can negatively impact user experience.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
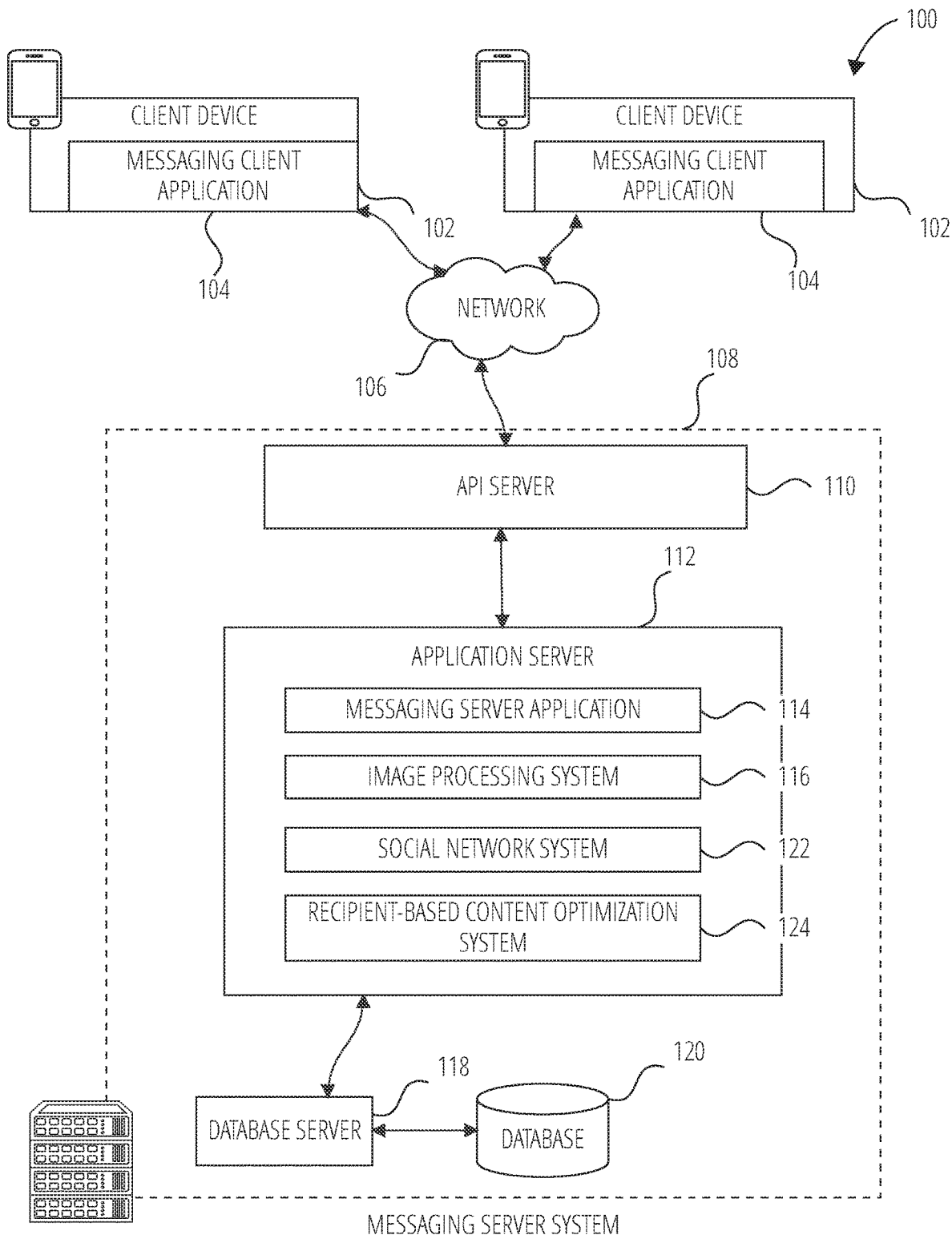
FIG. 1 is a diagrammatic representation of a networked environment in which the present disclosure may be deployed, in accordance with some example embodiments.

A user can share content to different types of audiences via a messaging application, such as 1-on-1 conversations, group conversations, public stories, private stories, stories shared with a custom audience. Each audience includes one or more recipients each using one or more client devices to run the messaging application to access the content. Client devices used to run a messaging application have different capabilities in terms of processing power, operating system, screen size, video playback capabilities, networking capabilities, etc. . . . Overlooking the heterogeneous capabilities of the client devices used to run the messaging application can negatively impact user experience. As an example, if the content accessed by a client device requires more processing power than the hardware capabilities of the client device, the client device might experience severe lag and over-consumption of resources, such as faster battery drain. This results in a poor user experience and unnecessary waste of resources. On the contrary, if the content accessed by a client device requires less processing power than the hardware capabilities of the client device, the client device will not display the best content quality it could have, and the user will not get the best user experience. As another example, if a client device with limited available bandwidth downloads a high bitrate video, the download will be slow resulting in a poor user experience. On the contrary, if a client device with a large screen displays a low-resolution video, the video quality will be low resulting in a poor user experience.

Some of the disclosed embodiments improve the efficiency of the messaging application by identifying the capabilities of the recipient devices (the client devices that will be used to access and view a content shared via the messaging application), and generating the most appropriate content considering the device capabilities of the recipient devices.

In some embodiments, in response to receiving, from a sender device, a content for sharing to one or more recipients via a messaging application, the messaging application server identifies at least one recipient device for each recipient. The server accesses device capabilities for each of the one or more recipient devices and determines a set of content parameters compatible with the device capabilities of all the recipient devices. In some embodiments, the server determines a set of content parameters offering a content quality satisfying preset quality requirements. In some embodiments, the server determines the set of content parameters offering the best content quality. The server generates a version of the content according to the set of content parameters and makes the generated version of the content available to the recipient devices.

In this way, all the recipient devices access a version of the content compatible with their device capabilities at the best possible quality. This increases the efficiency of running the messaging application on the recipient devices without wasting resources or degrading the overall user experience. Another solution would be to generate, for each recipient device, a version of the content specifically tailored for the recipient device. However, each version of the content requires server resources to be generated. Generating a single version of the content (or a limited number of versions of the content) that is compatible with every recipient devices limits the server resources required.

FIG. 1 is a block diagram showing an example messaging system 100 for exchanging data (e.g., messages and associated content) over a network. The messaging system 100 includes multiple instances of a client device 102, each of which hosts a number of applications including a messaging client application 104. Each messaging client application 104 is communicatively coupled to other instances of the messaging client application 104 and a messaging server system 108 via a network 106 (e.g., the Internet).

A messaging client application 104 is able to communicate and exchange data with another messaging client application 104 and with the messaging server system 108 via the network 106. The data exchanged between messaging client application 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality. the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, and opening an application event (e.g., relating to the messaging client application 104).

The application server 112 hosts a number of applications and subsystems, including a messaging server application 114, an image processing system 116, a social network system 122 and recipient-based content optimization system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

Figure 2:
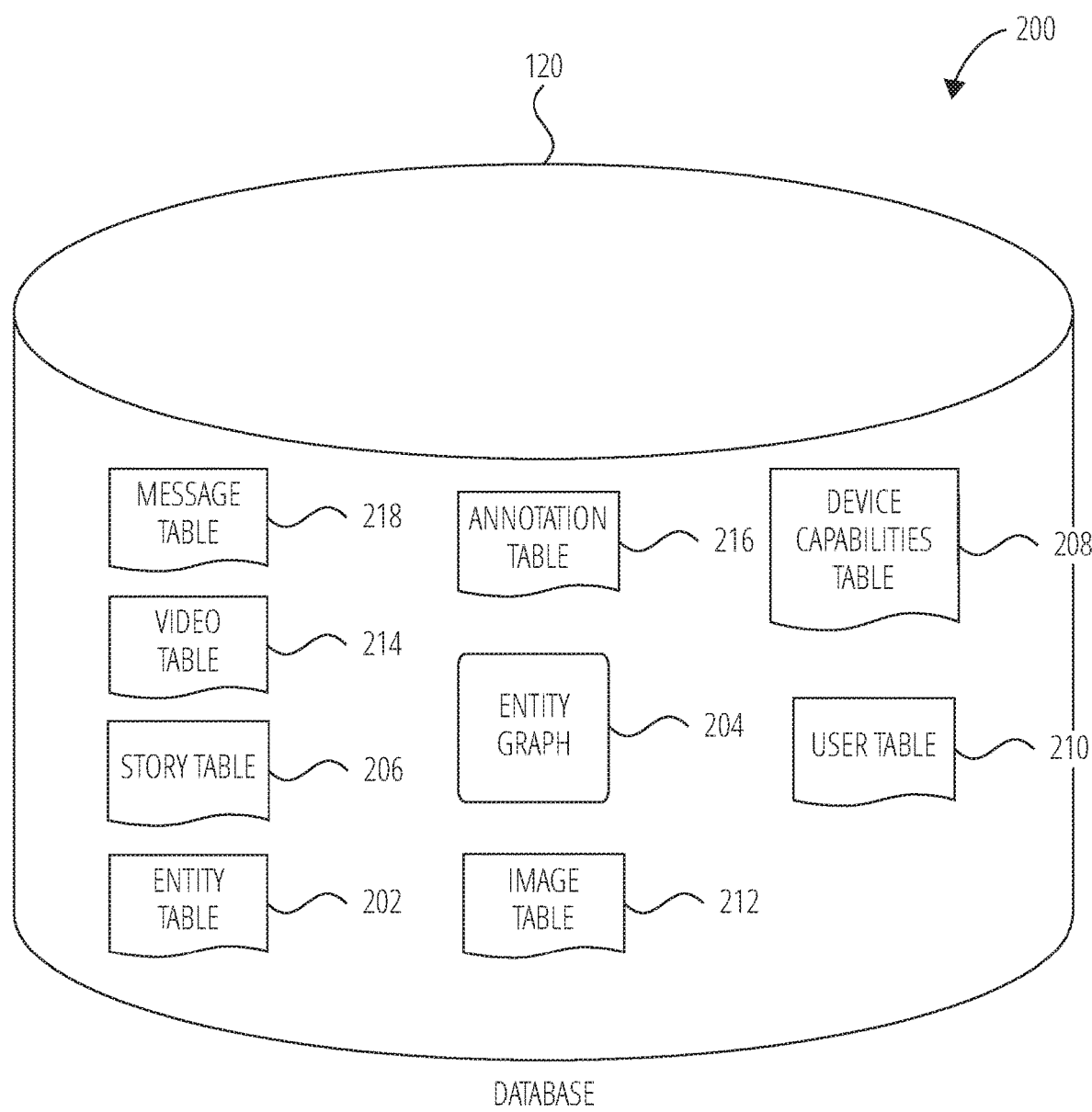
FIG. 2 is a diagrammatic representation of a data structure as maintained in a database, in accordance with some example embodiments.

The social network system 122 supports various social networking functions services, and makes these functions and services available to the messaging server application 114. To this end, the social network system 122 maintains and accesses an entity graph 204 (as shown in FIG. 2) within the database 120. Examples of functions and services supported by the social network system 122 include the identification of other users of the messaging system 100 with which a particular user has relationships or is "following", and also the identification of other entities and interests of a particular user.

The application server 112 is communicatively coupled to a database server 118, which facilitates access to a database 120 in which is stored data associated with messages processed by the messaging server application 114.

The recipient-based content optimization system 124 supports various recipient-based content optimization functions, and makes these functions and services available to the messaging server application 114. To this end, the recipient-based content optimization system 124 maintains and accesses a device capabilities table 208 (as shown in FIG. 2) within the database 120.

In some embodiments, the recipient-based content optimization system 124 receives, from a sender device (e.g., client device 102), a content to be shared with one or more recipients. The recipient-based content optimization system 124 identifies client devices used by the recipients and retrieve device capabilities of the identified recipient devices. The device capabilities can include one or more properties of the recipient devices. such as a device type, available memory storage space, current battery level, disk level attributes, operating system version, messaging client application version, processor type, or any other hardware capability of the recipient devices.

In some embodiments, the recipient-based content optimization system 124 selects a set of content parameters based on the device capabilities of the identified recipient devices. The set of content parameters may be selected based on a set of rules determining which content parameters are compatible with which device capabilities. For example, the set of rules may include one or more of the following rules:

a certain video coding format requires a minimum available memory storage space;
    a certain video coding format requires a minimum current battery level;
    a certain video coding format requires certain disk level attributes;
    a certain video coding format requires a certain operating system version;
    a certain video coding format requires a certain messaging client application version;
    a certain video coding format requires a certain processor type;
    a certain image resolution requires a minimum screen size;
    a certain image resolution requires a minimum available memory storage space;

a certain image resolution requires a minimum current battery level;
a certain image resolution requires certain disk level attributes;
a certain image resolution requires a certain operating system version;
a certain image resolution requires a certain messaging client application version;
a certain image resolution requires a certain processor type;
a certain data rate requires a minimum available bandwidth or connection speed/quality/class;
a certain data rate requires a minimum available memory storage space;
a certain data rate requires a minimum current battery level;
a certain data rate requires certain disk level attributes:
a certain data rate requires a certain operating system version;
a certain data rate requires a certain messaging client application version;
a certain data rate requires a certain processor type.

FIG. 2 is a schematic diagram illustrating data structures 200 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 218. The entity table 202 stores entity data, including an entity graph 204. Entities for which records are maintained within the entity table 202 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 204 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 216. Filters for which data is stored within the annotation table 216 are associated with and applied to videos (for which data is stored in a video table 214) and/or images (for which data is stored in an image table 212). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102, or the current time.

Other annotation data that may be stored within the image table 212 is so-called "lens" data. A "lens" may be a real-time special effect and sound that may be added to an image or a video.

As mentioned above, the video table 214 stores video data which, in one embodiment, is associated with messages for which records are maintained within the message table 218. Similarly, the image table 212 stores image data associated with messages for which message data is stored in the entity table 202. The entity table 202 may associate various annotations from the annotation table 216 with various images and videos stored in the image table 212 and the video table 214.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client application 104, to contribute content to a particular live story. The live story may be identified to the user by the messaging client application 104. based on his or her location. The end result is a "live story" told from a community perspective.

A further type of content collection is known as a "location story". which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

A user table 210 stores profiles for various users of the messaging client application 104. Such profile may include a list of client devices used by the user to access the messaging client application 104. Such profile may also include how active each user is, which features of the messaging client application 104 each user frequently uses, a content consumption history, and any other suitable information or combination of such information. The user information 221 is updated continuously or periodically as users utilize the messaging client application 104.

A device capabilities table 208 stores device capabilities of client devices. In some embodiments, the device capabilities are indexed by type of client devices (e.g., defined by a device model or type). In some cases, each client device running the messaging client application 104 may provide, upon installation of the messaging client application 104. its model and type and corresponding standard device capabilities. In some embodiments, the device capabilities are indexed by device identifier, each device identifier being associated with a specific client device. In some cases, each client device running the messaging client application 104 may provide, upon installation of the messaging client application 104. its specific device capabilities. The device capabilities can include static capability parameters, such as processor capabilities, operating system capabilities, a screen size, a messaging application version of the messaging application installed on the client device, and an operating system version installed on the client device. The device capabilities can also include dynamic capability parameters. such as a current battery level, an estimated available storage space on the recipient device an estimated available bandwidth. In such cases, the dynamic capability parameter for a given device can be updated periodically or continuously by polling or requesting such information from the given device.

Figure 3:
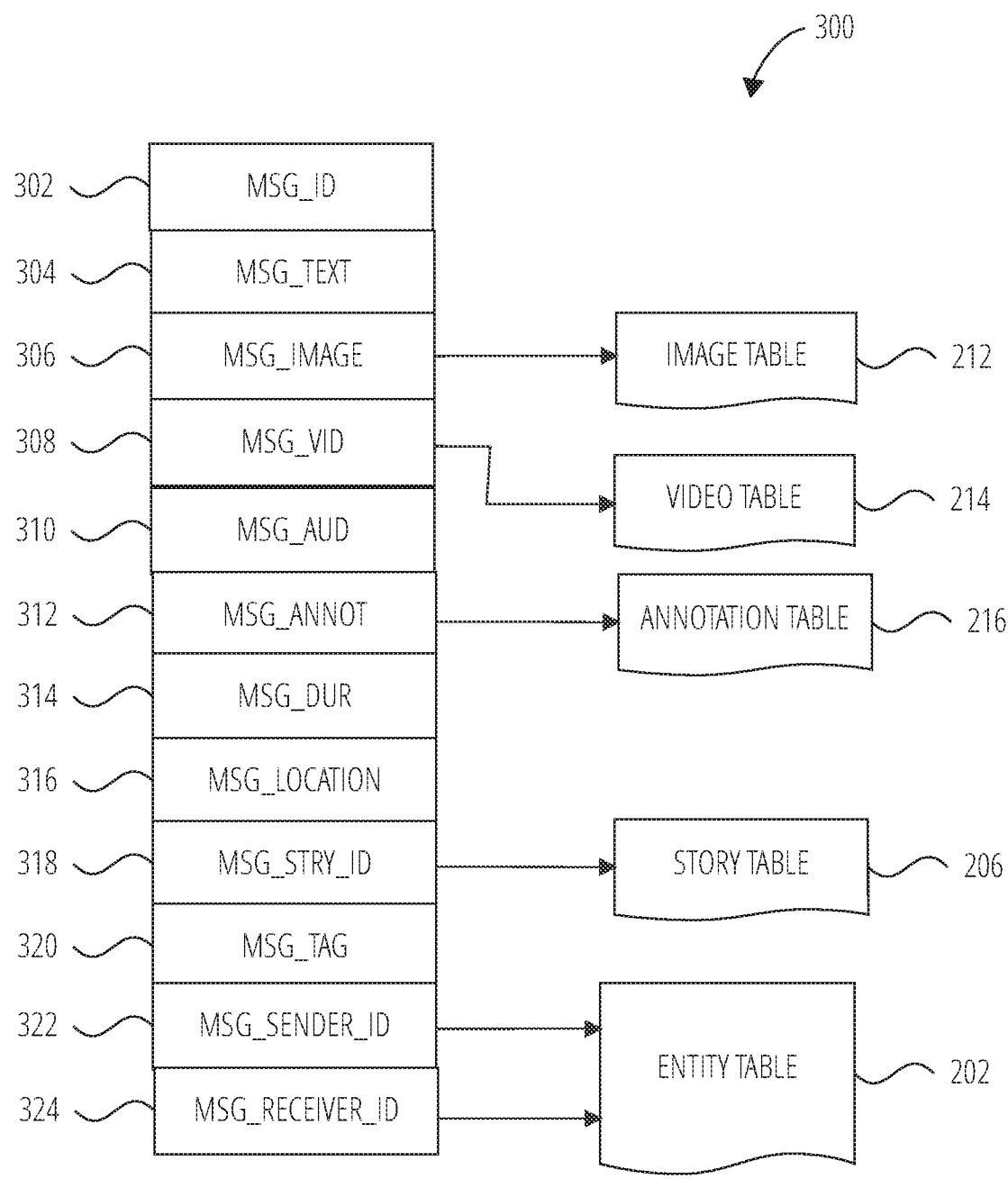
FIG. 3 is a diagrammatic representation of a message, in accordance with some example embodiments.

FIG. 3 is a schematic diagram illustrating a structure of a message 300, according to some in some embodiments, generated by a messaging client application 104 for communication to a further messaging client application 104 or the messaging server application 114. The content of a particular message 300 is used to populate the message table 218 stored within the database 120, accessible by the messaging server application 114. Similarly, the content of a message 300 is stored in memory as "in-transit" or "in-flight" data of the client device 102 or the application server 112. The message 300 is shown to include the following components:

- A message identifier 302: a unique identifier that identifies the message 300.
- A message text payload 304: text, to be generated by a user via a user interface of the client device 102 and that is included in the message 300.
- A message image payload 306: image data, captured by a camera component of a client device 102 or retrieved from a memory component of a client device 102, and that is included in the message 300.
- A message video payload 308: video data. captured by a camera component or retrieved from a memory component of the client device 102 and that is included in the message 300.
- A message audio payload 310: audio data, captured by a microphone or retrieved from a memory component of the client device 102, and that is included in the message 300.
- A message annotations 312: annotation data (e.g., filters, stickers or other enhancements) that represents annotations to be applied to message image payload 306, message video payload 308, or message audio payload 310 of the message 300.
- A message duration parameter 314: parameter value indicating, in seconds, the amount of time for which content of the message (e.g., the message image payload 306, message video payload 308, message audio payload 310) is to be presented or made accessible to a user via the messaging client application 104.
- A message geolocation parameter 316: geolocation data (e.g., latitudinal and longitudinal coordinates) associated with the content payload of the message. Multiple message geolocation parameter 316 values may be included in the payload, each of these parameter values being associated with respect to content items included in the content (e.g., a specific image into within the message image payload 306, or a specific video in the message video payload 308).
- A message story identifier 318: identifier values identifying one or more content collections (e.g., "stories") with which a particular content item in the message image payload 306 of the message 300 is associated. For example, multiple images within the message image payload 306 may each be associated with multiple content collections using identifier values.
- A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.
- A message sender identifier 322: an identifier (e.g., a messaging system identifier. email address, or device identifier) indicative of a user of the client device 102 on which the message 300 was generated and from which the message 300 was sent
- One or more message recipient identifiers 324: each identifier (e.g., a messaging system identifier, email address, or device identifier) is indicative of a user of the client device 102 to which the message 300 is addressed.

The contents (e.g., values) of the various components of message 300 may be pointers to locations in tables within which content data values are stored. For example, an image value in the message image payload 306 may be a pointer to (or address of) a location within an image table 212. Similarly, values within the message video payload 308 may point to data stored within a video table 214, values stored within the message annotations 312 may point to data stored in an annotation table 216. values stored within the message story identifier 318 may point to data stored in a story table 206, and values stored within the message sender identifier 322 and the message recipient identifier 324 may point to user records stored within an entity table 202.

Figure 4:
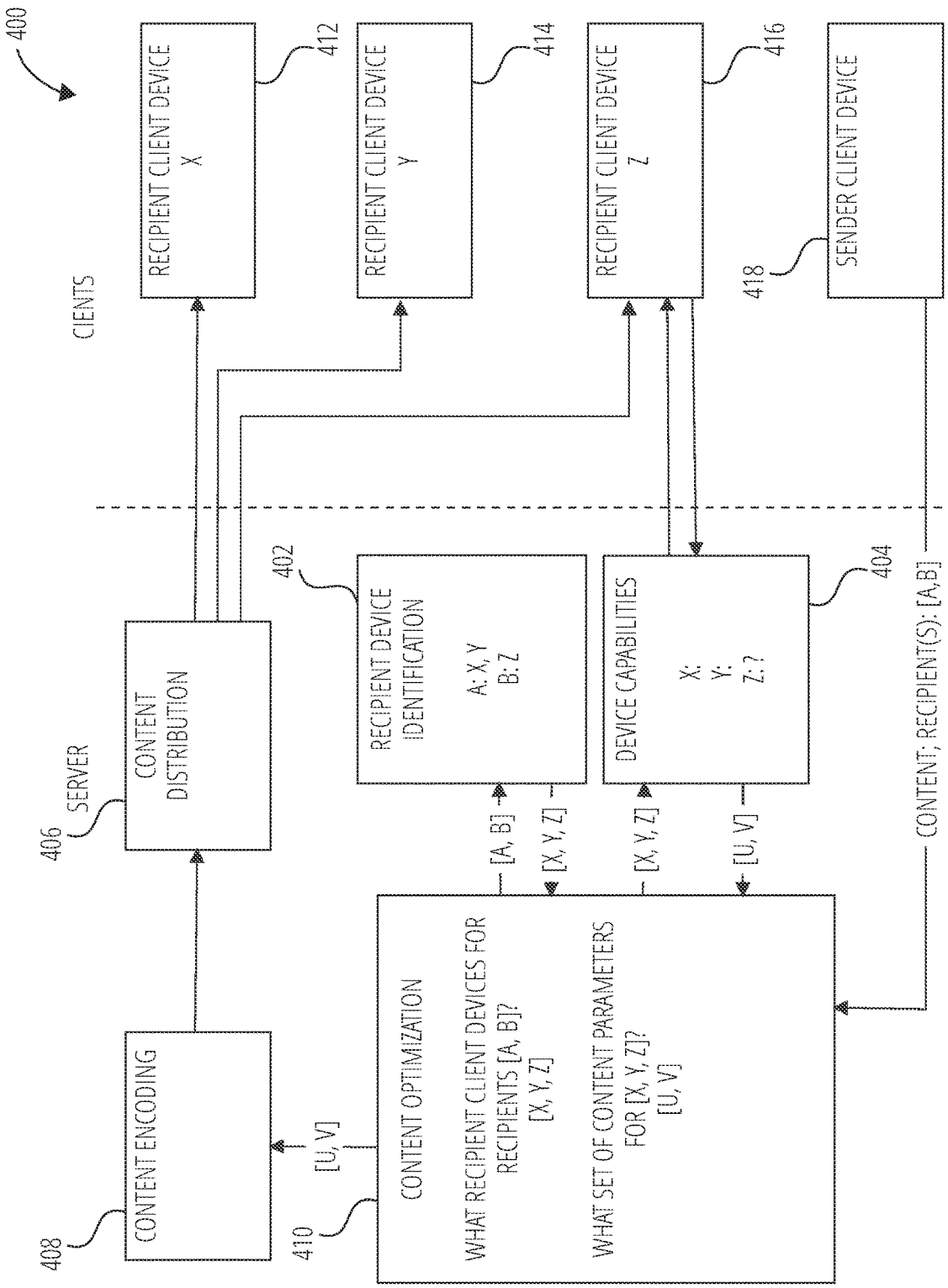
FIG. 4 illustrates a processing environment in accordance with one embodiment.

Turning now to FIG. 4, there is shown a diagrammatic representation of a processing environment 400, which includes a processor (e.g., a GPU, CPU or combination thereof).

The processor includes (either permanently configured or temporarily instantiated) modules, namely a recipient device identification component 402. device capabilities component 404, a content optimization component 410, and a content distribution component 406.

The device capabilities component 404 collects device capabilities information from client devices, formats and stores the device capabilities information collected from the client devices in the device capabilities table 208.

In response to receiving, from a sender device 418 (e.g., client device 102), a content to be shared with one or more recipients, the content optimization component 410 communicates with the recipient device identification component 402 to identify one or more recipient devices associated with the one or more recipients. In one embodiment, the content optimization component 410 identifies a plurality of recipients. Each of the recipients can be associated with one or more recipient devices.

The recipient device identification component 402 accesses the user table 210 to retrieve the identifiers of the one or more recipient devices and sends the retrieved identifiers to the content optimization component 410.

In response to receiving the identifiers of the one or more recipient devices, the content optimization component 410 communicates with the device capabilities component 404 to obtain the device capabilities of the one or more recipient devices. The device capabilities component 404 accesses the device capabilities table 208 to retrieve the device capabilities associated with the identifiers. In some embodiments, if the device capabilities table 208 does not have one of the capability parameters of a recipient device 416, the device capabilities component 404 may communicate directly with the recipient device 416 to obtain the capability parameter.

In response to receiving the device capabilities of the one or more recipient devices, the content optimization component 410 determines a set of content parameters based on the device capabilities of the one or more recipient devices. The set of content parameters can include parameters such as a video coding format (or video compression format) which can be a content representation format for storage or transmission of digital video content, an image resolution and a data rate.

In some embodiments, the device capabilities include operating system capabilities of the recipient devices. The content optimization component 410 determines a set of content parameters compatible with the operating system capabilities of the recipient device having the lowest operating system capabilities.

In some embodiments, the device capabilities include a messaging application version of the messaging application. The content optimization component 410 determines a set of content parameters compatible with the messaging application version of the client device having the oldest messaging application version of the messaging application.

In some embodiments, the device capabilities include current battery level of the recipient device. The content optimization component 410 determines a set of content parameters compatible with the current battery level of the recipient device having the lowest current battery level.

In some embodiments, the device capabilities include an estimated available storage space on the recipient device. The content optimization component 410 determines a set of content parameters compatible with the available storage space on the recipient device having the lowest available storage space.

In some embodiments, the device capabilities include an estimated available bandwidth of the recipient device. The content optimization component 410 determines a set of content parameters compatible with the estimated available bandwidth of the recipient device having the lowest estimated available bandwidth.

In response to determining the set of content parameters, the content optimization component 410 instructs the content encoding component 408 to generate a version of the content based on the set of content parameters. In some embodiments, the content optimization component 410 determines a plurality of sets of content parameters and instructs the content encoding component 408 to generate one version of the content for each set of content parameters.

In response to receiving the set of content parameters from the content optimization component 410, the content encoding component 408 generates one or more versions of the content according to the one or more sets of content parameters. The content encoding component 408 then sends the one or more content versions to the content distribution component 406 for the one or more content versions to be made available to the one or more recipient devices.

In response to receiving a request to access the content from one of the one or more recipient devices (e.g., recipient device 412. recipient device 414, recipient device 416), the content distribution component 406 provides the content version for the recipient device to download.

Figure 5:
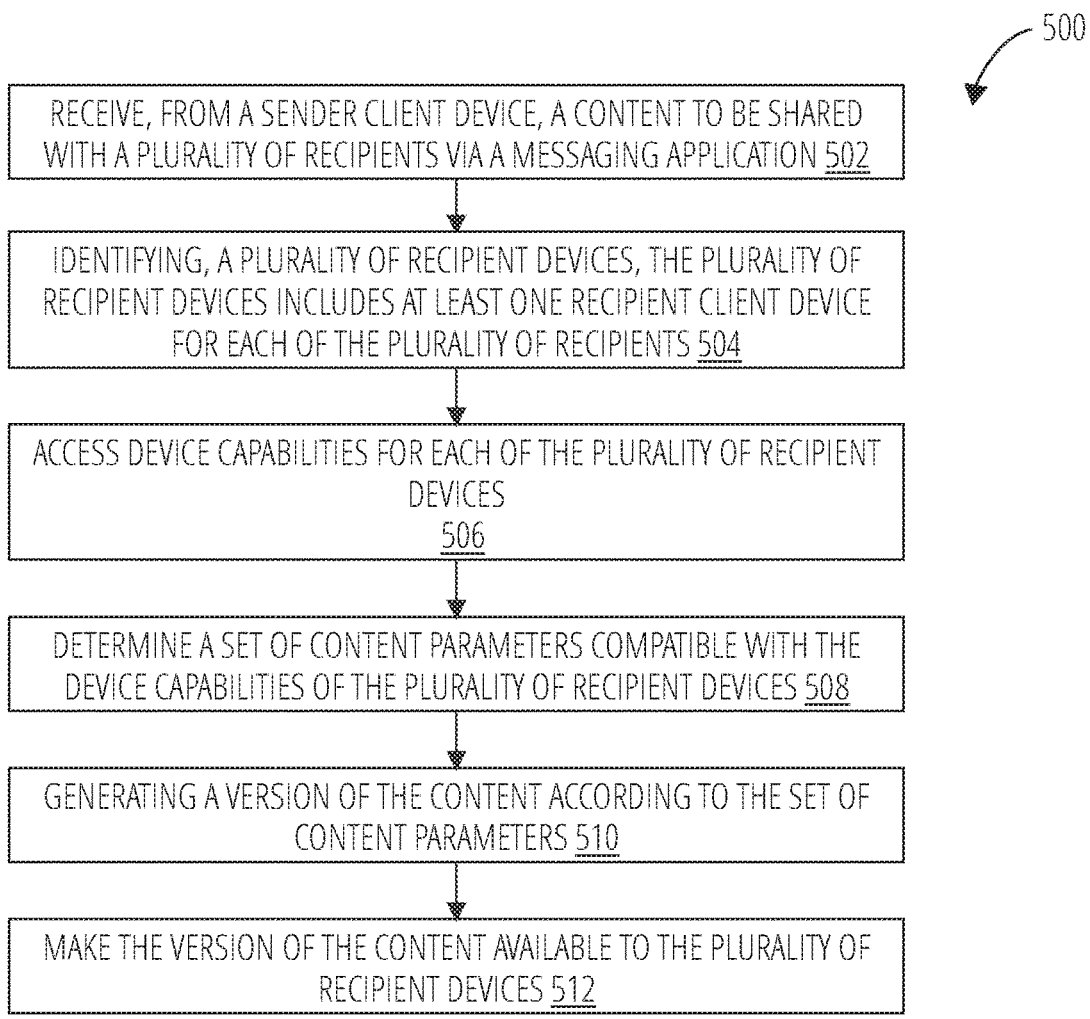
FIG. 5 illustrates a method in accordance with one embodiment.

FIG. 5 is a flowchart illustrating example operations of the recipient-based content optimization system 124 in performing a process 500, according to example embodiments. The process 500 may be embodied in computer-readable instructions for execution by one or more processors such that the operations of the process 500 may be performed in part or in whole by the functional components of the messaging server messaging system 100 and/or messaging client application 104; accordingly, the process 500 is described below by way of example with reference thereto. However, in other embodiments, at least some of the operations of the process 500 may be deployed on various other hardware configurations. The process 500 is therefore not intended to be limited to the messaging server messaging system 100 and can be implemented in whole, or in part, by any other component. Some or all of the operations of the process 500 can be in parallel, out of order, or entirely omitted.

At block 502, the content optimization component 410 receives, from a sender device 418, a first content to be shared with one or more recipients via the messaging system 100. In embodiments, the sender device 418 provides an identifier of each recipient (e.g., [A, B]). In other embodiments, the content optimization component 410 retrieves the identifiers of the recipients by communicating with the social network system 122.

In block 504, the content optimization component 410 identifies, for each of the one or more recipients, one or more recipient devices that could be used for accessing the content. In some embodiments, the recipient device identification component 402 accesses the user table 210 to retrieve the identifiers of the one or more recipient devices (e.g., [X, Y, Z]) associated with the identifier of each of the one or more recipients (e.g., [A, B]) and sends the retrieved identifiers (e.g., [X, Y, Z]) to the content optimization component 410.

In block 506, the content optimization component 410 accesses device capabilities for each of the one or more recipient devices. In some embodiments, in response to receiving the identifiers of the one or more recipient devices (e.g., [X, Y, Z]), the content optimization component 410 communicates with the device capabilities component 404 to obtain the device capabilities of the one or more recipient devices. The device capabilities component 404 accesses the device capabilities table 208 to retrieve the device capabilities associated with the identifiers (e.g., [X, Y, Z]).

In block 508, the content optimization component 410 determine the set of content parameters compatible with the device capabilities of all the recipient devices offering the best content quality, and instructs the content encoding component 408 to generate a version of the content based on the set of content parameters. The set of content parameters can include parameters such as a video coding format (or video compression format) which can be a content representation format for storage or transmission of digital video content, an image resolution and a data rate.

In block 510. in response to receiving the set of content parameters from the content optimization component 410, the content encoding component 408 generates a version of the content according to the set of content parameters.

In block 512, the content distribution component 406 makes the content version available to the recipient devices. In response to receiving a request for accessing the content from one of the recipient devices (e.g., recipient device 412, recipient device 414, recipient device 416), the content distribution component 406 provides the content version to the recipient device.

Figure 6:
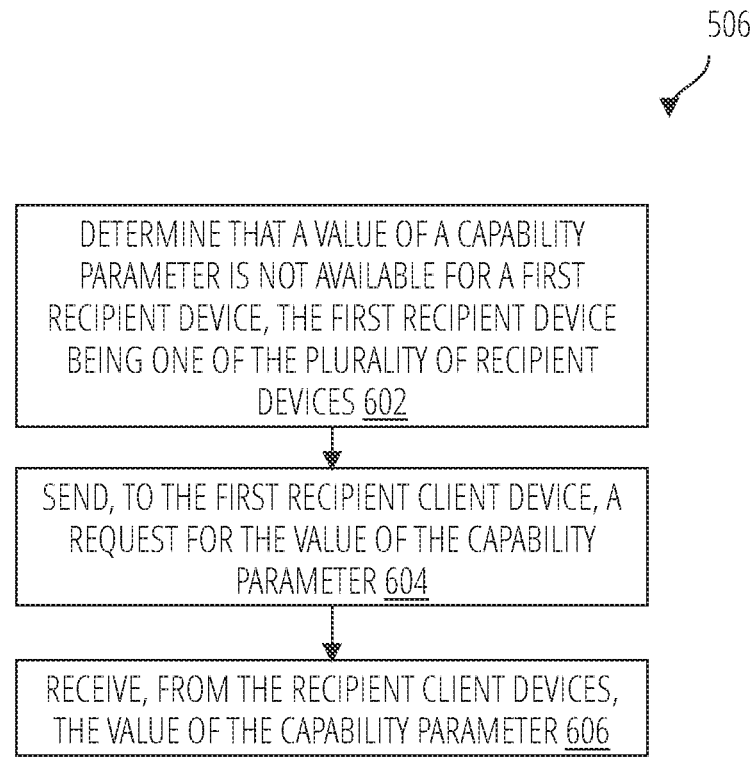
FIG. 6 illustrates a method in accordance with one embodiment.

As shown in FIG. 6, the block 506 in FIG. 5 may be a process that further includes blocks 602, 604, and 606, according to some embodiments. Consistent with some embodiments, blocks 602, 604, and 606 may be performed as part of (e.g., as sub-blocks or as a subroutine) of block 506, where the content optimization component 410 accesses device capabilities for each of the one or more recipient devices.

In block 602, the content optimization component 410 determines that a value of a capability parameter is not available for a first recipient device (e.g., recipient device 416) among the plurality of recipient devices. The value of the capability parameter may be an instant value of a dynamic capability parameter, such as current battery level, estimated available bandwidth, amount of available storage space.

In block 604, the content optimization component 410 sends a request, to the first recipient device, for the value of the capability parameter.

In block 606, the content optimization component 410 receives, from the first recipient device, the value of the capability parameter. In block 508, the content optimization component 410 considers the value of the capability parameter to determine the set of content parameters.

Figure 7:
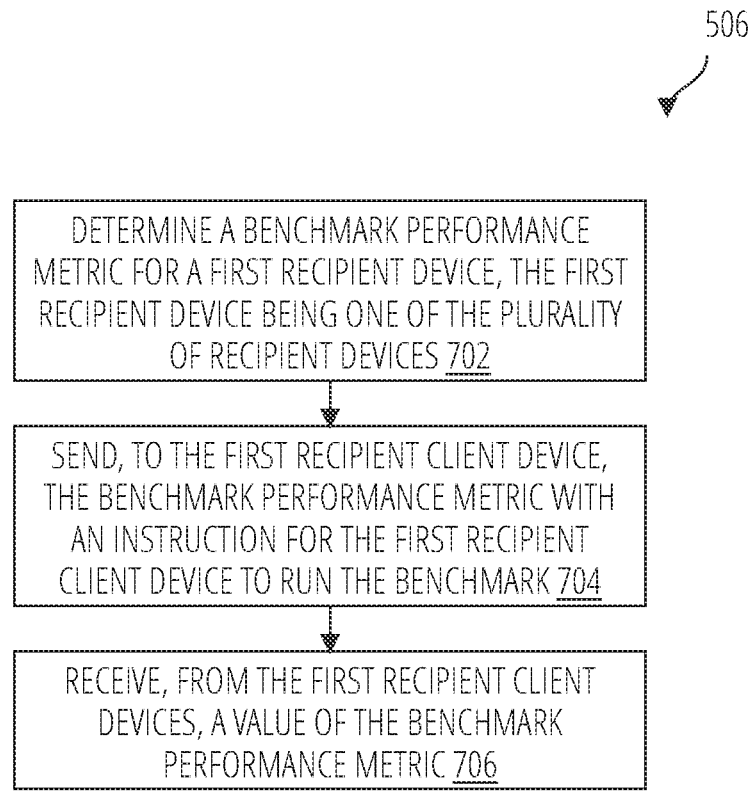
FIG. 7 illustrates a method in accordance with one embodiment.

As shown in FIG. 7, the block 506 in FIG. 5 may be a process that further includes blocks 702, 704, and 706, according to some embodiments. Consistent with some embodiments, blocks 702, 704, and 706 may be performed as part of (e.g., as sub-blocks or as a subroutine) of block 506, where the content optimization component 410 accesses device capabilities for each of the one or more recipient devices.

In block 702, the content optimization component 410 determines a benchmark performance metric for a first recipient device among the plurality of recipient devices (e.g., recipient device 416).

In block 704, the content optimization component 410 sends, to the first recipient client device, the benchmark performance metric with an instruction for the first recipient client device to run the benchmark.

In block 706, the content optimization component 410 receives, from the first recipient devices, a value of the benchmark performance metric. In block 508, the content optimization component 410 considers the value of the benchmark performance metric to determine the set of content parameters.

Figure 8:
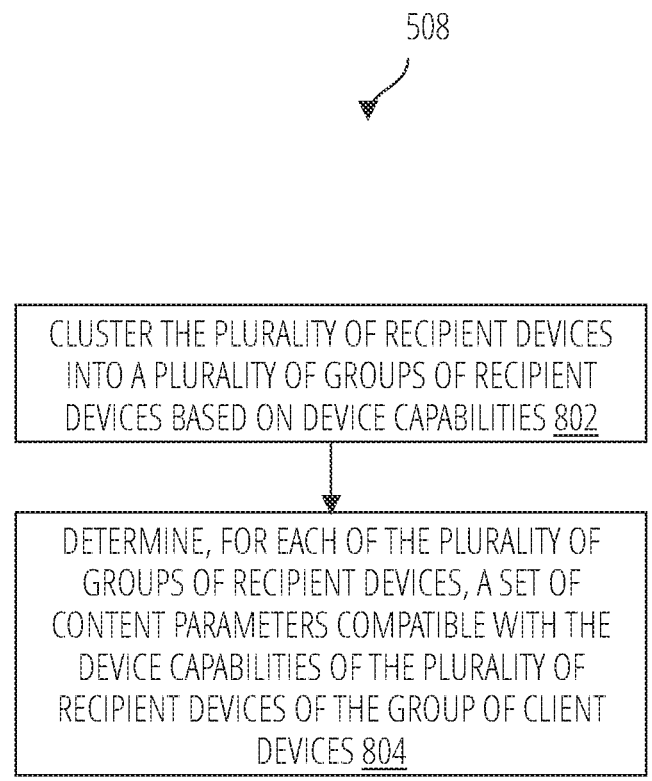
FIG. 8 illustrates a method in accordance with one embodiment.

As shown in FIG. 8, the block 508 in FIG. 5 may be a process that can further include blocks 802, and 804, according to some embodiments. Consistent with some embodiments, block 802 and block 804 may be performed as part of (e.g., as sub-blocks or as a subroutine) of block 506, where the content optimization component 410 accesses device capabilities for each of the one or more recipient devices.

In block 802, the content optimization component 410 clusters the plurality of recipient devices into a plurality of groups of client devices based on similarity of their device capabilities.

In block 804, the content optimization component 410 determines, for each group of recipient devices, a set of content parameters compatible with the device capabilities of all the recipient devices of the group of client devices.

In this embodiment, referring back to FIG. 5. in block 510, the content encoding component 408 generates, for each group of recipient devices, a version of the content according to the associated set of content parameters. In this embodiment, in block 512, the content distribution component 406 makes each version of the content available to the corresponding group of recipient devices. In response to receiving a request for accessing the content from one of the recipient devices (e.g., recipient device 412, recipient device 414, recipient device 416), the content distribution component 406 determines to which group the recipient device belongs and provide the content version associated with the group to the recipient device.

Figure 9:
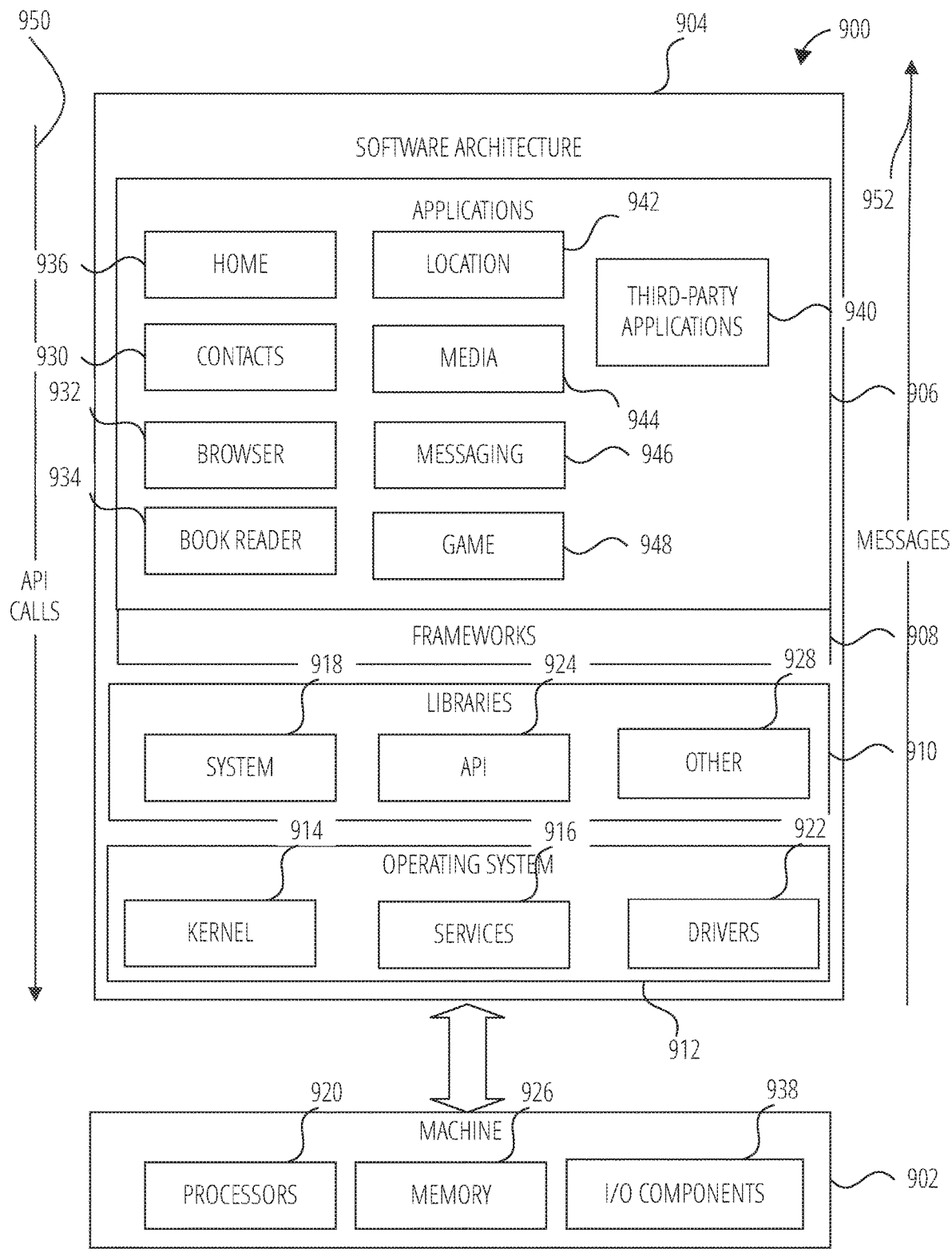
FIG. 9 is block diagram showing a software architecture within which the present disclosure may be implemented, in accordance with some example embodiments.

FIG. 9 is a block diagram 900 illustrating a software architecture 904, which can be installed on any one or more of the devices described herein. The software architecture 904 is supported by hardware such as a machine 902 that includes processors 920, memory 926, and I/O components 938. In this example, the software architecture 904 can be conceptualized as a stack of layers, where each layer provides a particular functionality. The software architecture 904 includes layers such as an operating system 912. libraries 910, frameworks 908, and applications 906. Operationally, the applications 906 invoke API calls 950 through the software stack and receive messages 952 in response to the API calls 950.

The operating system 912 manages hardware resources and provides common services. The operating system 912 includes, for example, a kernel 914. services 916, and drivers 922. The kernel 914 acts as an abstraction layer between the hardware and the other software layers. For example, the kernel 914 provides memory management, processor management (e.g., scheduling), component management, networking, and security settings, among other functionality. The services 916 can provide other common services for the other software layers. The drivers 922 are responsible for controlling or interfacing with the underlying hardware. For instance, the drivers 922 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 910 provide a low-level common infrastructure used by the applications 906. The libraries 910 can include system libraries 918 (e.g., C standard library) that provide functions such as memory allocation functions. string manipulation functions, mathematic functions, and the like. In addition, the libraries 910 can include API libraries 924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3). Advanced Audio Coding (AAC). Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions). web libraries (e.g., WebKit to provide web browsing functionality), and the like. The libraries 910 can also include a wide variety of other libraries 928 to provide many other APIs to the applications 906.

The frameworks 908 provide a high-level common infrastructure that is used by the applications 906. For example, the frameworks 908 provide various graphical user interface (GUI) functions, high-level resource management, and high-level location services. The frameworks 908 can provide a broad spectrum of other APIs that can be used by the applications 906, some of which may be specific to a particular operating system or platform.

In an example embodiment, the applications 906 may include a home application 936, a contacts application 930, a browser application 932, a book reader application 934, a location application 942, a media application 944, a messaging application 946, a game application 948, and a broad assortment of other applications such as third-party applications 940. The applications 906 are programs that execute functions defined in the programs. Various programming languages can be employed to create one or more of the applications 906, structured in a variety of manners, such as object-oriented programming languages (e.g., Objective-C, Java, or C++) or procedural programming languages (e.g., C or assembly language). In a specific example, the third-party applications 940 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 940 can invoke the API calls 950 provided by the operating system 912 to facilitate functionality described herein.

Figure 10:
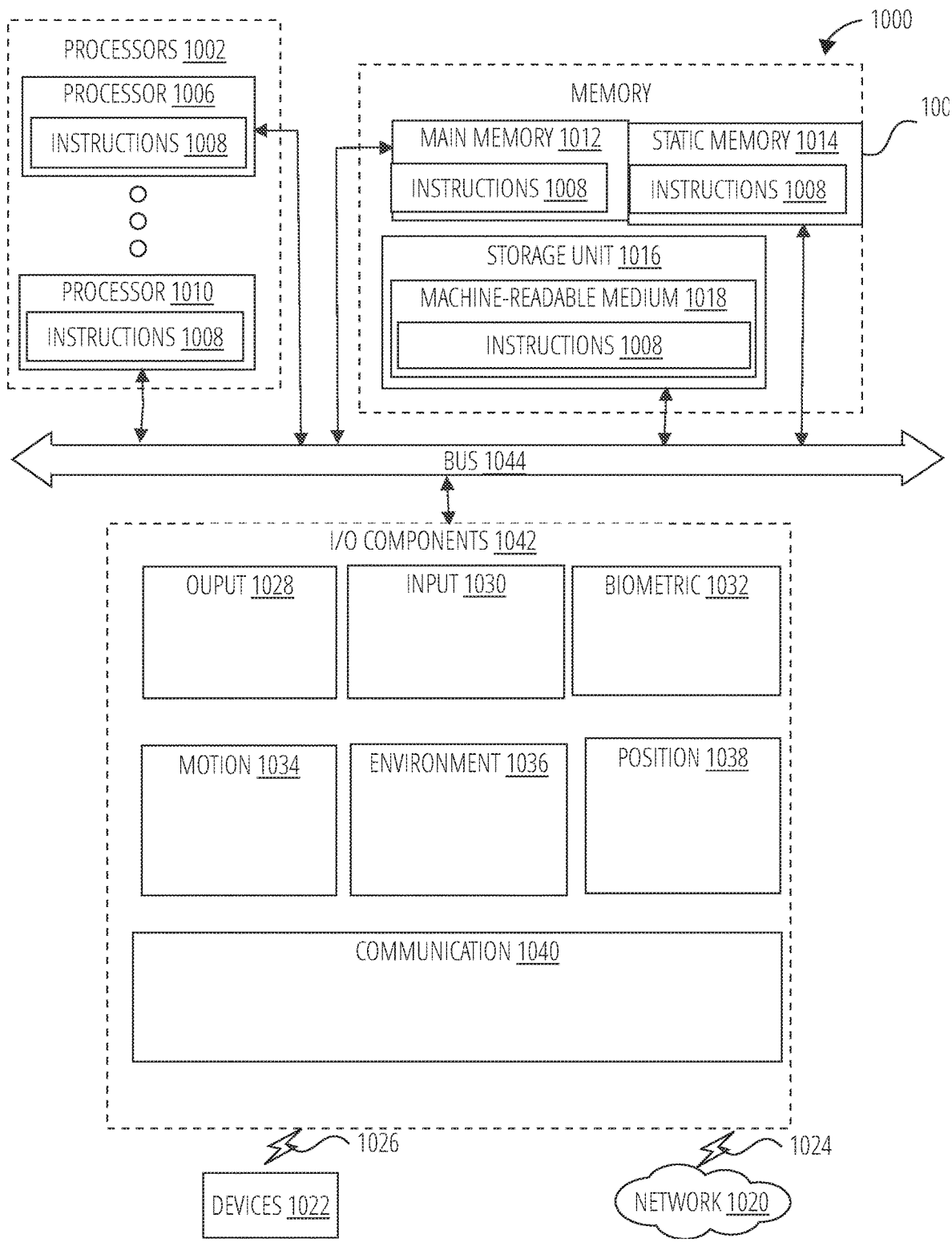
FIG. 10 is a diagrammatic representation of a machine, in the form of a computer system within which a set of instructions may be executed for causing the machine to perform any one or more of the methodologies discussed, in accordance with some example embodiments.

FIG. 10 is a diagrammatic representation of a machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein.

The machine 1000 may include processors 1002, memory 1004, and I/O components 1042, which may be configured to communicate with each other via a bus 1044. In an example embodiment, the processors 1002 (e.g., a Central Processing Unit (CPU), a Reduced Instruction Set Computing (RISC) processor, a Complex Instruction Set Computing (CISC) processor, a Graphics Processing Unit (GPU), a Digital Signal processor (DSP), an ASIC, a Radio-Frequency Integrated Circuit (RFIC), another processor, or any suitable combination thereof) may include, for example, a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, both accessible to the processors 1002 via the bus 1044. The main memory 1004, the static memory 1014, and storage unit 1016 store the instructions 1008 embodying any one or more of the methodologies or functions described herein. The instructions 1008 may also reside, completely or partially, within the main memory 1012. within the static memory 1014. within machine-readable medium 1018 within the storage unit 1016, within at least one of the processors 1002 (e.g., within the processor's cache memory), or any suitable combination thereof, during execution thereof by the machine 1000.

The I/O components 1042 may include a wide variety of components to receive input, provide output, produce output, transmit information, exchange information, capture measurements, and so on. The specific I/O components 1042 that are included in a particular machine will depend on the type of machine. For example, portable machines such as mobile phones may include a touch input device or other such input mechanisms, while a headless server machine will likely not include such a touch input device. It will be appreciated that the I/O components 1042 may include many other components that are not shown in FIG. 10. In various example embodiments, the I/O components 1042 may include output components 1028 and input components 1030. The output components 1028 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms). other signal generators, and so forth. The input components 1030 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone). and the like.

In further example embodiments, the I/O components 1042 may include biometric components 1032, motion components 1034. environmental components 1036, or position components 1038, among a wide array of other components. For example, the biometric components 1032 include components to detect expressions (e.g., hand expressions, facial expressions, vocal expressions, body gestures, or eye tracking), measure biosignals (e.g., blood pressure, heart rate, body temperature. perspiration, or brain waves), identify a person (e.g., voice identification, retinal identification, facial identification, fingerprint identification, or electroencephalogram-based identification), and the like.

The motion components 1034 include acceleration sensor components (e.g., accelerometer), gravitation sensor components, rotation sensor components (e.g., gyroscope), and so forth. The environmental components 1036 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1042 further include communication components 1040 operable to couple the machine 1000 to a network 1020 or devices 1022 via a coupling 1024 and a coupling 1026, respectively. For example, the communication components 1040 may include a network interface component or another suitable device to interface with the network 1020. In further examples, the communication components 1040 may include wired communication components, wireless communication components, cellular communication components. Near Field Communication (NFC) components, Bluetooth® components (e.g., Bluetooth® Low Energy), Wi-Fi® components, and other communication components to provide communication via other modalities. The devices 1022 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components. NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geolocation, location via Wi-Fi® signal triangulation, location via detecting an NFC beacon signal that may indicate a particular location, and so forth.

The various memories (e.g., memory 1004, main memory 1012, static memory 1014, and/or memory of the processors 1002) and/or storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed embodiments.

The instructions 1008 may be transmitted or received over the network 1020, using a transmission medium, via a network interface device (e.g., a network interface component included in the communication components 1040) and using any one of a number of well-known transfer protocols (e.g., hypertext transfer protocol (HTTP)). Similarly, the instructions 1008 may be transmitted or received using a transmission medium via the coupling 1026 (e.g., a peer-to-peer coupling) to the devices 1022.

What is claimed is:

1. A method comprising:
   receiving, by one or more processors, from a sender device, a content to be shared with a plurality of recipients via a messaging application;
   identifying, by the one or more processors, a plurality of recipient devices, the plurality of recipient devices includes at least one recipient device for each of the plurality of recipients;
   accessing, by the one or more processors, device capabilities for each of the plurality of recipient devices;
   determining, by the one or more processors, a set of content parameters compatible with the device capabilities of the plurality of recipient devices, wherein determining the set of content parameters compatible with the device capabilities of the plurality of recipient devices further comprises:
      clustering, by the one or more processors, the plurality of recipient devices into a plurality of groups of recipient devices based on device capabilities;
      determining, for each group of recipient devices, a set of content parameters compatible with the device capabilities of the plurality of recipient devices of a group of client devices; and
      generating, for each group of recipient devices, a version of the content according to an associated set of content parameters.

2. The method of claim 1, wherein accessing device capabilities for each of the plurality of recipient devices further comprises:
   determining that a value of a capability parameter is not available for a first recipient device, the first recipient device being one of the plurality of recipient devices;
   sending, to the first recipient device, a request for the value of the capability parameter; and
   receiving, from the first recipient devices, the value of the capability parameter.

3. The method of claim 1, wherein accessing device capabilities for each of the plurality of recipient devices further comprises:
   determining a benchmark performance metric for a first recipient device, the first recipient device being one of the plurality of recipient devices;
   sending, to the first recipient device, the benchmark performance metric with an instruction for the first recipient device to run the benchmark; and
   receiving, from the first recipient devices, a value of the benchmark performance metric.

4. The method of claim 1, wherein the device capabilities include processor capabilities, and wherein, for each group of recipient devices, the associated set of content parameters is compatible with the processor capabilities of the recipient device having the lowest processor capabilities among the recipient devices of the group of recipient devices.

5. The method of claim 1, wherein the device capabilities include operating system capabilities, and wherein, for each group of recipient devices, the associated set of content parameters is compatible with the operating system capabilities of the recipient device having the lowest operating system capabilities among the recipient devices of the group of recipient devices.

6. The method of claim 1, wherein the device capabilities include a messaging application version of the messaging application, and wherein, for each group of recipient devices, the associated set of content parameters is compatible with the messaging application version of the recipient device having the oldest messaging application version among the recipient devices of the group of recipient devices.

7. The method of claim 1, wherein the device capabilities include current battery level, and wherein, for each group of recipient devices, the associated set of content parameters is compatible with the current battery level of the recipient device having the lowest current battery level among the recipient devices of the group of recipient devices.

8. The method of claim 1, wherein the device capabilities include an available storage space, and wherein, for each group of recipient devices, the associated set of content parameters is compatible with the storage space available on the recipient device having the lowest available storage space among the recipient devices of the group of recipient devices.

9. The method of claim 1, wherein the device capabilities include an available bandwidth, and wherein, for each group of recipient devices, the associated set of content parameters is compatible with the available bandwidth of the recipient device having the lowest available bandwidth among the recipient devices of the group of recipient devices.

10. The method of claim 1, wherein the set of content parameters includes one or more of a video coding format, an image resolution, and a data rate.

11. The method of claim 1, wherein the set of content parameters is selected to offer the best content quality.

12. The method of claim 1, wherein the set of content parameters is selected to offer a content quality satisfying preset quality requirements.

13. A system comprising:
a processor; and
a memory storing instructions that, when executed by the processor, configure the system to perform operations comprising:
receiving, from a sender device, a content to be shared with a plurality of recipients via a messaging application;
identifying a plurality of recipient devices, the plurality of recipient devices includes at least one recipient device for each of the plurality of recipients;
accessing device capabilities for each of the plurality of recipient devices;
determining a set of content parameters compatible with the device capabilities of the plurality of recipient devices, wherein determining the set of content parameters compatible with the device capabilities of the plurality of recipient devices further comprises:
clustering the plurality of recipient devices into a plurality of groups of recipient devices based on device capabilities;
determining, for each group of recipient devices, a set of content parameters compatible with the device capabilities of the plurality of recipient devices of a group of client devices; and
generating, for each group of recipient devices, a version of the content according to an associated set of content parameters.

14. The system of claim 13, wherein accessing device capabilities for each of the plurality of recipient devices further comprises:
determining that a value of a capability parameter is not available for a first recipient device, the first recipient device being one of the plurality of recipient devices;
sending, to the first recipient device, a request for the value of the capability parameter; and
receiving, from the first recipient devices, the value of the capability parameter.

15. The system of claim 13, wherein accessing device capabilities for each of the plurality of recipient devices further comprises:
determining a benchmark performance metric for a first recipient device, the first recipient device being one of the plurality of recipient devices; and
sending, to the first recipient device, the benchmark performance metric with an instruction for the first recipient device to run the benchmark;
receiving, from the first recipient devices, a value of the benchmark performance metric.

16. The system of claim 13, wherein the device capabilities include processor capabilities, and wherein, for each group of recipient devices, the associated set of content parameters is compatible with the processor capabilities of the recipient device having the lowest processor capabilities among the recipient devices of the group of recipient devices.

17. The system of claim 13, wherein the device capabilities include operating system capabilities, and wherein, for each group of recipient devices, the associated set of content parameters is compatible with the operating system capabilities of the recipient device having the lowest operating system capabilities among the recipient devices of the group of recipient devices.

18. A non-transitory computer-readable storage medium, the computer-readable storage medium including instructions that when executed by a computer, cause the computer to:
receiving, from a sender device, a content to be shared with a plurality of recipients via a messaging application;
identifying a plurality of recipient devices, the plurality of recipient devices includes at least one recipient device for each of the plurality of recipients;
accessing device capabilities for each of the plurality of recipient devices;
determining a set of content parameters compatible with the device capabilities of the plurality of recipient devices; and
determining a set of content parameters compatible with the device capabilities of the plurality of recipient devices, wherein determining the set of content parameters compatible with the device capabilities of the plurality of recipient devices further comprises:
clustering the plurality of recipient devices into a plurality of groups of recipient devices based on device capabilities;
determining, for each group of recipient devices, a set of content parameters compatible with the device capabilities of the plurality of recipient devices of a group of client devices; and
generating, for each group of recipient devices, a version of the content according to an associated set of content parameters.

* * * * *